(12) United States Patent
Schmuecker et al.

(10) Patent No.: US 8,220,779 B2
(45) Date of Patent: Jul. 17, 2012

(54) WHEEL SUSPENDER AND WEIGHING MACHINE COMPRISING A WHEEL SUSPENDER

(75) Inventors: Volker Schmuecker, Waldesch (DE); Michael Schurr, Murrhardt (DE)

(73) Assignee: Soehnle Professional GmbH & Co. KG, Backnang (DE)

( * ) Notice: Subject to any disclaimer, the term of this patent is extended or adjusted under 35 U.S.C. 154(b) by 935 days.

(21) Appl. No.: 11/911,483

(22) PCT Filed: Nov. 23, 2005

(86) PCT No.: PCT/EP2005/012501
§ 371 (c)(1),
(2), (4) Date: Sep. 22, 2008

(87) PCT Pub. No.: WO2006/108449
PCT Pub. Date: Oct. 19, 2006

(65) Prior Publication Data
US 2009/0194751 A1    Aug. 6, 2009

(30) Foreign Application Priority Data

Apr. 14, 2005   (DE) .......................... 10 2005 018 279
Jun. 22, 2005   (DE) .......................... 10 2005 029 203

(51) Int. Cl.
*B66F 7/00*   (2006.01)

(52) U.S. Cl. ......................................... 254/88; 254/134

(58) Field of Classification Search .................... 254/88, 254/131, 134, 2 B
See application file for complete search history.

(56) References Cited

U.S. PATENT DOCUMENTS

| | | | | |
|---|---|---|---|---|
| 1,902,218 A * | 3/1933 | Coomber | ........................ | 254/88 |
| 4,692,082 A | 9/1987 | Smith et al. | | |
| 4,848,732 A * | 7/1989 | Rossato | ........................ | 254/90 |
| 4,922,339 A * | 5/1990 | Stout et al. | .................... | 348/143 |
| 5,215,287 A * | 6/1993 | Leski | .............................. | 254/88 |
| 5,308,933 A * | 5/1994 | Ahl | ................................ | 177/135 |
| 5,336,031 A * | 8/1994 | Golan | ........................... | 414/229 |
| 5,346,354 A | 9/1994 | Hellstrom et al. | | |
| 6,045,122 A * | 4/2000 | Torres | ............................. | 254/88 |
| 6,417,465 B1 * | 7/2002 | Cullen | .......................... | 177/126 |
| 7,376,216 B2 * | 5/2008 | Hodge | ............................ | 378/57 |
| 2009/0194751 A1 * | 8/2009 | Schmucker et al. | ......... | 254/8 R |

FOREIGN PATENT DOCUMENTS

| | | |
|---|---|---|
| DE | 4200033 | 7/1993 |
| DE | 19930414 | 1/2001 |
| GB | 343772 | 2/1931 |
| GB | 888694 | 1/1962 |

OTHER PUBLICATIONS

International Search Report, PCT/EP2005/012501 dated Mar. 16, 2006.
International Preliminary Report on Patentability, PCT/EP2005/012501 dated Oct. 30, 2007.

* cited by examiner

*Primary Examiner* — Lee D Wilson
(74) *Attorney, Agent, or Firm* — Leydig, Voit & Mayer, Ltd.

(57) ABSTRACT

A wheel suspender includes a ramp. A lifting device is configured to apply a force onto a wheel so as to move the wheel up the ramp.

17 Claims, 8 Drawing Sheets

000
WHEEL SUSPENDER AND WEIGHING MACHINE COMPRISING A WHEEL SUSPENDER

CROSS REFERENCE TO PRIOR APPLICATIONS

This application is a U.S. National Phase Application under 35 U.S.C. §371 of International Application No. PCT/EP2005/012501, filed on Nov. 23, 2005, which claims benefit to German Application Nos. DE 10 2005 029 203.8, filed Jun. 22, 2005 and DE 10 2005 018 279.8, filed Apr. 14, 2005. The International Application was published in German on Oct. 19, 2006 as WO 2006/108449 under PCT Article 21 (2).

FIELD

The present invention relates to a wheel suspender for raising a wheel. Furthermore, the present invention relates to a bed weighing machine which has a wheel suspender.

BACKGROUND

Bed weighing machines are used in particular for weighing hospital beds in situations in which a patient cannot leave the bed because of his state of health for his weight to be monitored, and therefore bed and patient have to be weighed together. A bed weighing machine usually has, for each leg of a bed, a respective weighing device with which the bed weight acting on the respective leg can be measured. Since the bed weighing machine according to the present invention serves in particular for determining the weight of a hospital bed together with a patient and a hospital bed usually has one wheel on each leg, a wheel suspender is provided for each weighing device in order namely to raise the leg together with the wheel and, in the raised state, to measure the proportional weight of the bed that acts on the weighing device. Accordingly, the wheel suspender serves to raise and, if appropriate, fix the wheel in a raised position, so that the proportional weight of the bed can act on the weighing device.

The applicant's patent application DE 10 2005 029 203.8 which has not been published before the filing date of the present patent application discloses a bed weighing machine with a weighing module, the operation of which in this respect is basically comparable to the weighing device operation just described. The wheel is pushed there onto a ramp by means of a lifting means, the lifting means having a lifting element which can be adjusted by a unit which can be adjusted in the axial direction and has self-locking. The axially adjustable unit can have, for example, a spindle with self-locking and can be driven by an electric motor drive, for example fed by means of a battery, in particular by means of a cordless screwdriver. In order to avoid repetitions, reference is made to DE 10 2005 018 279.8, the entire disclosure content of which is hereby expressly incorporated.

SUMMARY

In an embodiment, the present invention provides a wheel suspender with a ramp. A lifting device is arranged and designed in such a manner that a wheel can be moved up or down the ramp by means of the lifting device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
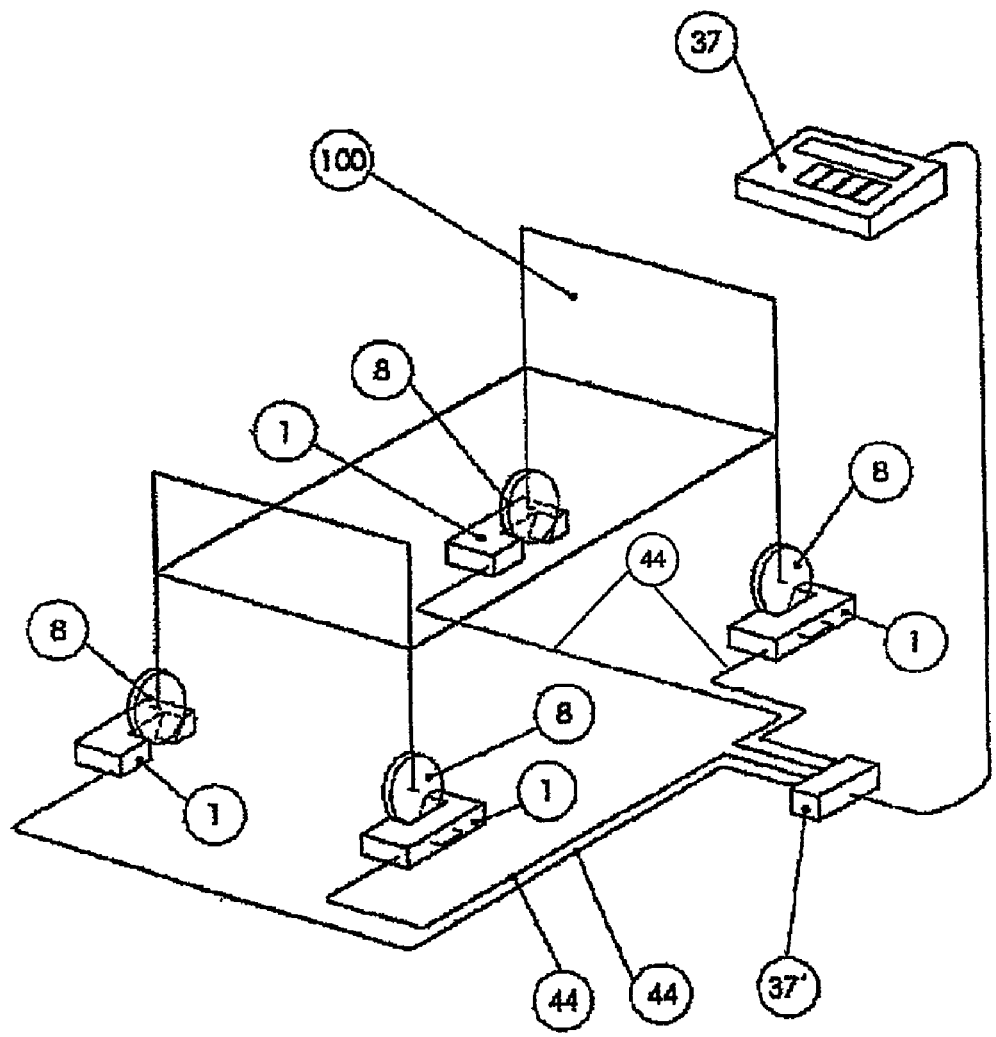
FIG. 1 shows a schematic illustration of a hospital bed, the wheels of which are each received by a weighing device of a bed weighing machine.

In one embodiment, the lifting device comprises a lever device. In another embodiment, the lifting device has a motor drive. In another embodiment, the lifting device has a crank drive. In another embodiment, the lifting device has a hydraulic or pneumatic drive. In yet another embodiment, the lifting device has a threaded drive. In one embodiment, the lifting device acts on the running surface of the wheel to be lifted. In another embodiment, the lifting device has a rotary sleeve and/or a thrust wheel which, during a lifting operation, rolls along the running surface of the wheel to be lifted. In another embodiment, the lifting device acts on the axle of the wheel to be lifted.

In one embodiment the lever device comprises a toggle lever or a toggle lever arrangement. In another embodiment, the lever device is designed in such a manner that there is self-locking in at least one operating state. In another embodiment, the lever device can be fixed—preferably releasably again—in a self-locking position by overextension of the toggle lever or of the toggle lever arrangement.

In one embodiment, the wheel suspender has at least one sliding foot and/or at least one wheel for displacing the wheel suspender relative to the underlying surface.

In one embodiment, the ramp has a section—preferably of trough-shaped design—for receiving the wheel, and/or in that at least part of the ramp is arranged in a manner such that it can pivot about an axis.

In one embodiment, wheel suspender is part of a weighing machine, in particular a bed weighing machine.

The present invention further provides a bed weighing machine comprising at least one wheel suspender as described above. In one embodiment, the bed weighing machine has a plurality of—preferably four—weighing devices, wherein a respective weighing device could be provided for each leg of the bed. In one embodiment, each weighing device has a wheel suspender. In another embodiment, a plurality of weighing devices for weighing an object are linked to one another—preferably without cables. In yet another embodiment, the weighing devices are connected to a processor—preferably without cables.

The present invention provides a wheel suspender and a bed weighing machine which constitutes an essentially equivalent alternative and is possibly simpler to handle or more cost effective to produce.

In an embodiment, a wheel suspender of this type has a ramp and a lifting device. The lifting device is arranged relative to the ramp in such a manner and is designed in such a manner that a wheel can be moved up and/or down the ramp by means of the lifting device. In other words, the wheel is moved along the ramp by means of the lifting device and, in the process, is raised if the wheel rolls up the ramp or lowered if the wheel rolls down the ramp. The ramp could be designed in the form of a sloping plane and could have an essentially planar surface along which the running surface of the wheel rolls during movement on the ramp. Furthermore, the ramp could be arranged on the wheel suspender relative to the lifting device in such a manner that the wheel is arranged between ramp and lifting device. When the lifting device is actuated, the wheel is therefore moved away from the lifting device and in the direction of the ramp. However, the lifting device could also be arranged on the side of the ramp with respect to the wheel, in which case at least one extension arm of the lifting device is provided on that side of the wheel which faces away from the ramp and, when the lifting device is actuated, acts on the wheel in such a manner that the wheel is pulled onto the ramp. The ramp could be designed in interaction with the lifting device in such a manner that the lifting device pushes the wheel to be lifted up the ramp and beyond it if, for example, a trough-shaped recess in which the wheel can be fixed is provided at the upper end of the ramp. The lifting device could have means with which the wheel can be moved out of the trough-shaped recess again such that the wheel rolls down the ramp and is therefore lowered. The wheel suspender according to the invention is therefore based on the principle that the wheel to be raised is arranged between a component of the lifting device and the ramp and that the component of the lifting device is moved onto the ramp at least in respect of one movement component, as a result of which the wheel rolls up the ramp and, in the process, is raised. Accordingly, the lowering of the wheel takes place in the reverse sequence and direction.

In a preferred embodiment, the lifting device has a lever device. The lever device serves to actuate that part of the lifting device which brings about the movement of the wheel relative to the ramp. This may merely be a pivotably arranged lever which can be locked in a raised position of the wheel, for example by means of a latching-in device. The lever device preferably has a toggle lever or a toggle lever arrangement, i.e. not only is a lever provided but so to is at least one further strut or a further articulated part. The design of the toggle lever or of the toggle lever arrangement depends on the specific design of the lifting device and is explained in more detail with reference to an example in the description of the figures.

Preferably, the lever device is designed in such a manner that there is self-locking in at least one operating state of the lifting device. The lever device could therefore be designed in such a manner that there is self-locking when the wheel is in a raised position. Self-locking within the meaning of the present invention is to be understood in particular as meaning a design of the lever device such that, in the self-locked state the lever device and of the optionally provided articulated connections of struts of the lever device, are arranged with respect to one another in such a manner that the forces acting on the lever device from the wheel prevent a lowering of the wheel. There is therefore a stable state of the lever device of the wheel suspender—comparable to a "mechanical potential pot"—into which the lever device can be brought by appropriate application of force in order to raise the wheel. In this state, the wheel is in a raised state provided that the lever device of the wheel suspender is correspondingly designed or configured. This is discussed further within the context of an exemplary embodiment together with the description of the figures, in particular for FIG. 4.

In this connection, the lever device could also be designed in such a manner that it can be fixed in a self-locking position by overextension of the toggle lever. This is also entered into in more detail with reference to an exemplary embodiment by the description of the figures, in particular according to FIG. 4. The lever device is preferably designed in such a manner that it can be released again from its fixed position, for example by actuation of the lever.

In one embodiment of the lifting device, the latter can be actuated purely mechanically by an operator, to be precise in such a manner that the operator deflects the lever, for example by using his foot to press down the lever. The operator therefore has to apply the force required to raise the wheel, which can be facilitated by the lever or the mechanically designed lifting device having a favorable force transmission ratio for this and therefore being relatively easy to actuate.

However, it could be provided that the lifting device has a motor drive. For example, an electric motor could be provided as the motor drive, the electric motor interacting by means of its rotor via a step-up gear with a spindle and, by rotation of the spindle, deflecting the lifting device or a lever of the lifting device such that the wheel can be raised by a motor as a result.

It would also be conceivable for the lifting device to have a crank drive. The lifting device or a lever of the lifting device can be deflected by manual rotation of a crank such that the wheel can be raised. The crank itself could be adaptable removably to the wheel suspender. Furthermore, the crank could be designed in interaction with the housing of the wheel suspender in such a manner that the crank can be locked reversibly to the housing in a predeterminable position, for example by bending over the crank at a bending joint and by latching it in at a recess provided for this purpose on the housing of the wheel suspender. This could take place when the wheel is in a raised position.

In addition or as an alternative, the lifting device could have a hydraulic or a pneumatic drive. The hydraulic or pneumatic drive could have, for example, a pump which could be driven manually (comparable to an air pump or piston pump) or electrically (with an electric motor). It is also conceivable that the hydraulic or pneumatic drive of the wheel suspender can be connected to a hydraulic or pneumatic circuit system, for example via at least one correspondingly provided quick-action coupling. In this case, a corresponding valve could be provided on the wheel suspender, with which valve pressurized liquid or pressurized gas can be removed from the hydraulic or pneumatic circuit system and can be fed to a piston arrangement of the hydraulic or pneumatic drive of the wheel suspender. It could furthermore be provided that a further outlet valve is provided or that the valve has a position in which hydraulic fluid can be dispensed again to the hydraulic circuit system in order to return it to a tank of the hydraulic circuit system.

The lifting device could have a threaded drive. The threaded drive could interact with a crank, a motor, hydraulic or pneumatic drive, and therefore, on the basis of a high transmission ratio, could permit easy actuation of the lifting device. Accordingly, the thread pitch of the threaded drive is preferably selected in such a manner that a favorable transmission ratio for the particular type of drive can be obtained.

It is preferably provided that the lifting device acts on the running surface of the wheel to be lifted. For this purpose, the lifting device could have a rotary sleeve and/or a thrust wheel which, during a lifting operation, rolls along the running surface of the wheel to be lifted. This prevents the wheel from blocking during the lifting operation, since the lifting device or the rotary sleeve and/or the thrust wheel usually acts on the running surface of the wheel, on the side of said wheel which faces away from the ramp. The wheel can firstly roll up or down the ramp and secondly can roll along the rotary sleeve or the thrust wheel of the lifting device with very little friction. Furthermore, the wheel could be moved up and down the ramp by the wheel quite generally being arranged between the ramp and the lifting device and at least one component of the lifting device being moved towards the ramp. For example, the lifting device itself could have a ramp which has an inclination essentially oriented in the opposite direction to the ramp of the wheel suspender, and therefore the ramp of the wheel suspender and the ramp of the lifting device are oriented in an essentially V-shaped manner to each other. If the ramp of the lifting device is moved in the direction of the ramp of the wheel suspender, the wheel is thereby "pressed" upward. Since the wheel does not block nor do frictional losses occur during the lifting operation, rotary sleeves or sliding rollers on which the wheel can roll could be provided at least on one of the two ramps. It is also conceivable to move the two ramps toward each other if a corresponding mechanism is provided for this purpose on the wheel suspender.

In an alternative embodiment, the lifting device could act on the axle of the wheel to be lifted. For this purpose, the lifting device could have a fork-shaped component which can come into engagement with at least one projection provided on the axle mounting of the wheel or with the wheel axle, which is of extended design (if appropriate on both sides of the wheel). The lifting device could therefore be designed in such a manner that, when it is actuated, the wheel is firstly moved along the ramp and, in the process, rolls with at least one weight component on the ramp and, secondly, the remaining weight component is used by the lifting device for the lifting movement. It would also be conceivable for the lifting device to be designed in such a manner that, together with a component coming into engagement with the wheel axle or with a projection provided on the axle mounting of the wheel, it can move or pull the wheel in the direction of the ramp such that the wheel is thereby drawn onto the ramp, in order to raise the wheel.

In particular if the wheel suspender is used for a bed weighing machine, it is provided, in a very particularly preferred embodiment, that the wheel suspender has at least one sliding foot and/or at least one wheel for displacing the wheel suspender relative to the underlying surface. It can thereby be prevented that, when raising the bed legs together with the respective wheels, the individual wheel suspenders become distorted in relation to one another, which opposes an operation to lift the bed. This enables the bed to be moved or transported while still in a raised state, to be precise without removing the wheel suspenders, should a patient in a hospital bed have to be rushed into an operating room. The sliding foot or wheel could be fixable such that the hospital bed does not unintentionally roll away. Such a fixing could take place with a component of the lifting device if the latter is in a state in which the wheel is raised.

In a further embodiment, the ramp could have a section for receiving or fixing the wheel. For example, an upper ramp section could be of trough-shaped design. The ramp could also have an upper section which is designed such that it is virtually horizontal or slopes downward, and a stop for the wheel, into which the wheel can be brought in its raised position and is thereby fixed there. It would also be conceivable for at least part of the ramp to be arranged in a manner such that it can pivot about an axis, and therefore, during the lifting operation, the ramp initially has a function of a sloping plane up which the wheel rolls. As soon as the wheel has passed the pivot axis of the ramp, the ramp pivots about the axis into a locking position such that the wheel is locked in the raised state ("rocker function" of the ramp). In this connection, the lifting device could be designed in such a manner that the wheel can be moved again out of a raised and fixed/locked position such that it can roll down the ramp and therefore is lowered.

Preferably, the wheel suspender is part of a weighing machine with which wheel or axle loads of an object having at least one wheel can be weighed. For example, such an object could be a vehicle, a trailer or a bed, in particular a hospital bed. In the latter case, the weighing machine is a bed weighing machine.

In a preferred embodiment, the bed weighing machine has a plurality of weighing devices. In this case, a respective weighing device could be provided for each leg of the bed. The bed weighing machine could therefore specifically have four weighing devices.

At least one—and preferably each—weighing device could have a wheel suspender. In this respect, after the wheel of a leg of the bed has been raised by the wheel suspender, a weighing device can determine its weight proportion.

So that the entire weight of the bed with a patient and not only the proportion of weight acting on one leg of the bed can be determined, a plurality of weighing devices for weighing the hospital bed—quite generally an object—are preferably linked to one another. This linkage could be connected to a cable connection between a respective weighing device and a processor or an evaluator. This involves a star-shaped linkage with regard to the processor or evaluator. The individual weighing devices could also be linked to one another, with a cable connection to a processor/evaluator being provided just from one weighing device (annular linkage). Such a cable connection could be used, for example, to supply an electric motor of a wheel suspender with electric power via a dedicated electric line.

The linkage of a respective weighing device with a processor or evaluator particularly preferably takes place without cables. In this case, a weighing device has a transmitter which sends signals representing the weight proportion acting on the weighing device. The processor or evaluator has a receiver which receives the signals sent by the transmitter of the weighing device. The processor or evaluator could also have a transmitter with which a request signal is transmitted which can be received by respective receivers provided in the weighing devices. Triggered by the request signal, the weighing devices could carry out a weighing operation virtually at the same time and could transmit the respective result to the processor or evaluator. Transmitters and receivers of the individual weighing devices or the processor or evaluator transmit on a specific frequency or with a specific characteristic, so that the weighing operation is not disturbed by transmission signals from other weighing devices of another bed weighing machine, which weighing devices, under some circumstances, are in the same room.

Identical or similar components are identified in the figures by the same reference numbers. FIG. 1 shows, in a schematic illustration, how the wheels 8 of a hospital bed 100 are received by weighing devices 1. Each weighing device 1 produces measurement signals which represent the weight proportion of the hospital bed 100 which exerts a load on them. The signals pass via the lines 44 to the connecting box 37' where they are collated. The collated signal is passed to the evaluator 37 which displays the weight which exerts an overall load on the weighing devices 1 of the bed weighing machine. The weighing devices 1 shown in FIG. 1 each have an electric drive with which a respective wheel 8 can be raised. The supply of the electric drive of a weighing device 1 with electric current is likewise realized via the line 44.

Figure 2:
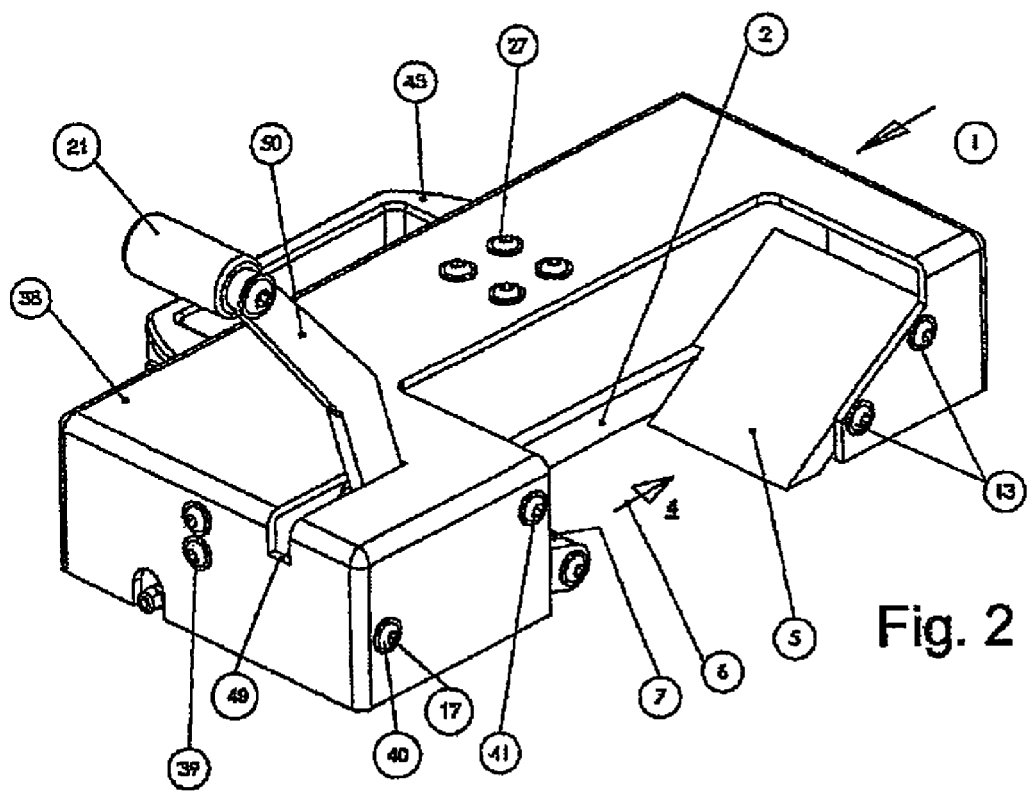
FIG. 2 shows an exemplary embodiment of a weighing device in a perspective view, which has a wheel suspender according to the invention.

FIG. 2 shows, in a perspective illustration, a weighing device 1 which is of essentially U-shaped design in order to be able to receive a wheel 8 by means of the recess 4. The U-shaped design of the weighing module 1 can likewise be seen in the plan view of the weighing device 1 from FIG. 3 A ramp 5 is provided on the one side of the recess 4. A roller or rotary sleeve 7 which is movable toward the ramp 5 in the direction of the arrow 6 is provided on the opposite side.

In order to weigh a hospital bed 100, a respective weighing device 1 is placed with its recess 4 around a wheel 8 of the hospital bed 100. The rotary sleeve 7 is then displaced in the direction of the arrow 6 such that the wheel 8 is pushed onto the ramp 5 until it is raised from the floor.

Figure 3:
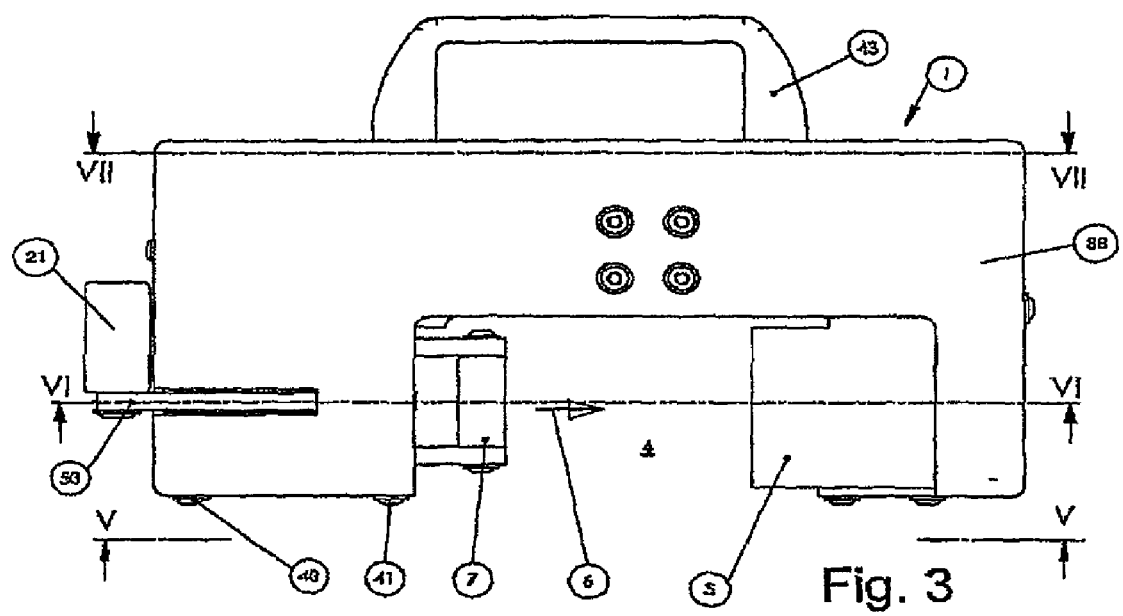
FIG. 3 shows a plan view of the weighing device from FIG. 2.
Figure 4:
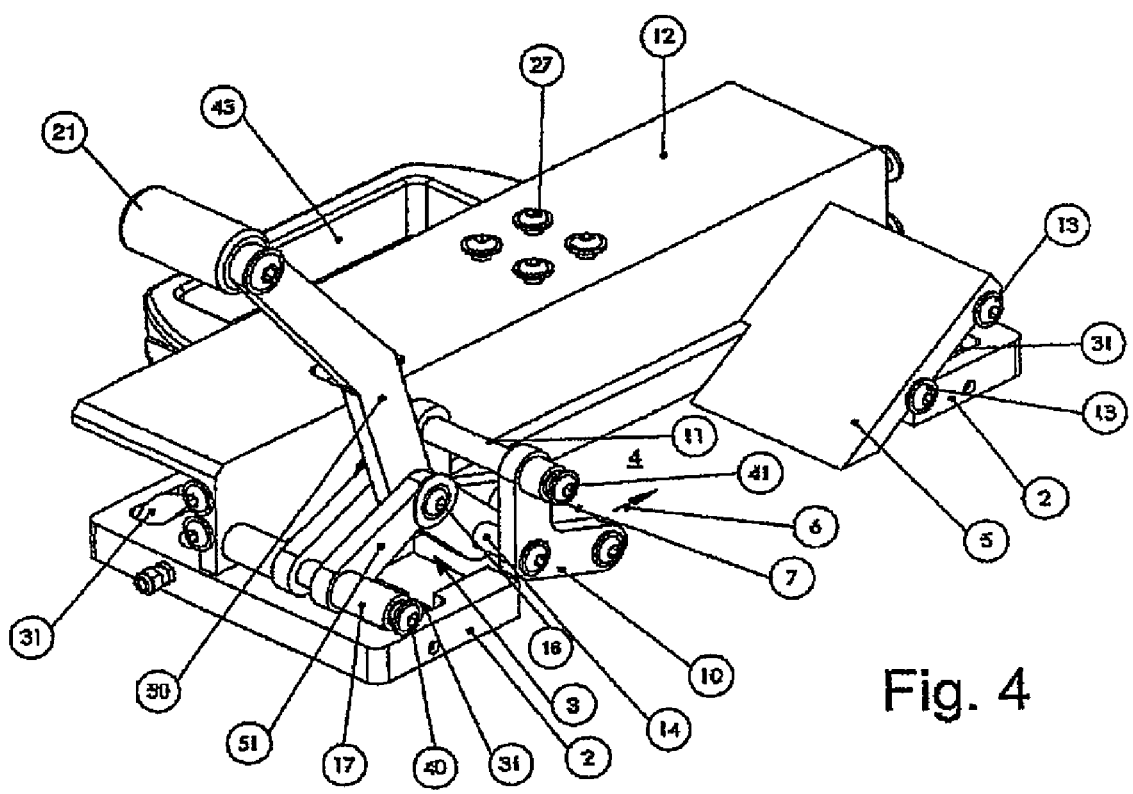
FIG. 4 shows a perspective view of the weighing device from FIG. 2 with the covering hood removed.
Figure 5:
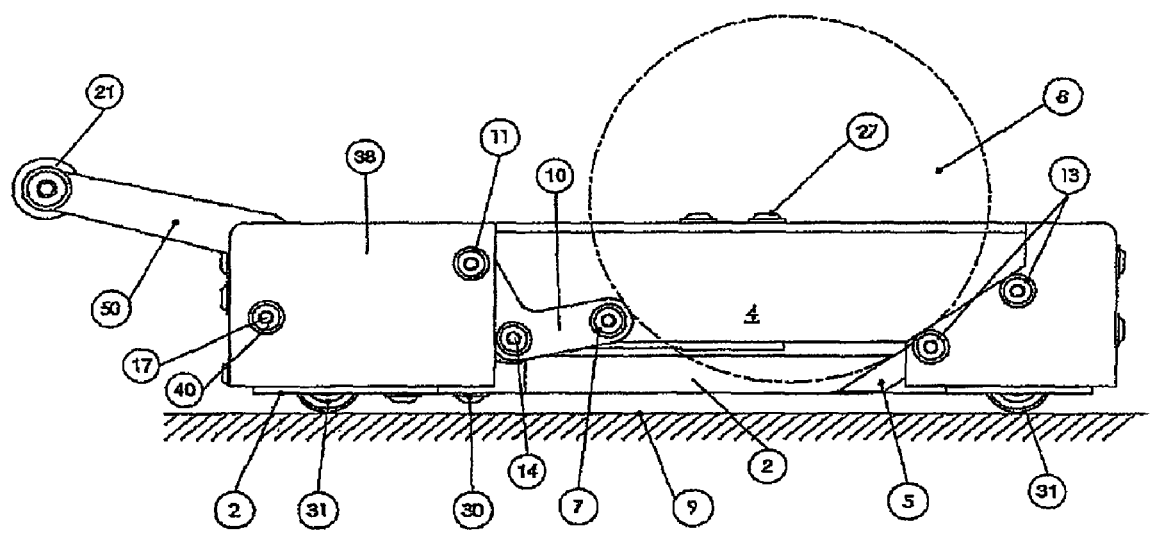
FIG. 5 shows a side view of the weighing device from FIG. 2, as seen from the direction of the arrows V-V from FIG. 3.
Figure 6:
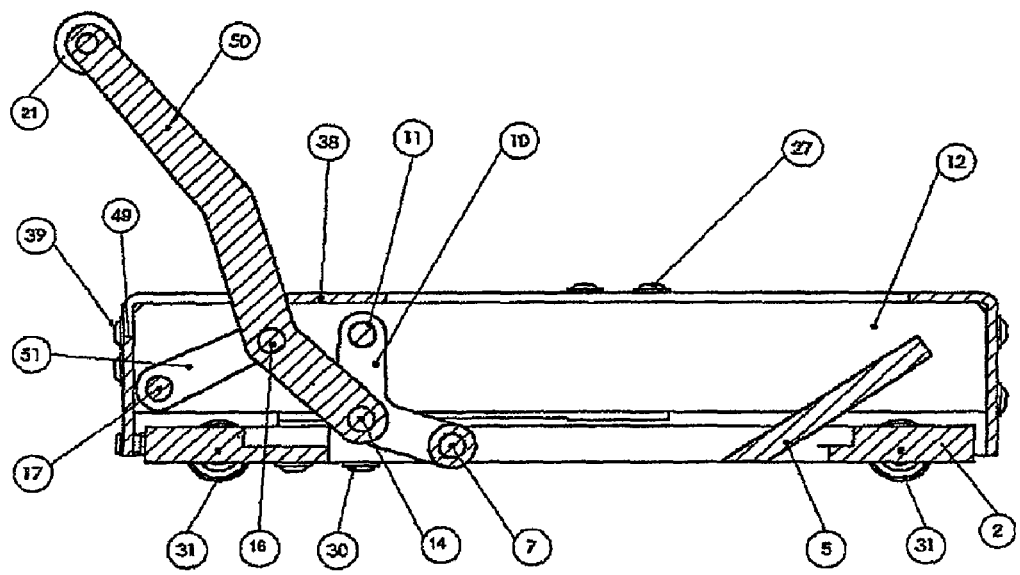
FIG. 6 shows a sectional view along the arrows VI-VI from FIG. 3.

FIG. 4 shows, in a perspective view, the weighing device 1 from FIGS. 2 and 3, but without the covering hood 38. It can be seen from FIG. 4 that the ramp 5 itself is fastened to the plate 12 by two screws 13. The plate 12 has an essentially L-shaped cross section. The lifting device 3 is arranged on the plate 12. The lifting device 3 has a lever device which comprises a lever 50, a double strut 51 and an extension arm 10. The double strut 51 is mounted rotatably at its one end about an axis 17 defined by the screw 40. At its other end, the double strut 51 is mounted rotatably with respect to the lever 50 by means of an axis 16 defined by a screw connection. The lever 50 is connected at its one end to the extension arm 10 in a manner such that it can rotate about the axis 14 formed by a screw connection. The other end of the lever 50 has a handle part 21 with which the lever 50 can be pressed downward out of the position shown in FIG. 4, and can therefore be brought into a position which is shown in FIG. 5. This can take place, for example, with an operator's foot.

The extension arm 10 is arranged rotatably about the axis 11 and is fastened to the plate 12 by means of the screw 41. The arrangement of the lever 50, the double strut 51 and the extension arm 10 and the respective axes of rotation 17, 16, 14 and 11 result in the formation of a four-bar mechanism with which the extension arm 10 can be moved out of its position shown in FIG. 4 in the arrow direction 6 and obliquely upward if the lever 50 is moved downward out of its position shown in FIG. 4. By this means, in a particularly advantageous manner and actuable in a simple and purely mechanical manner, a wheel can be moved obliquely up the ramp 5 and can therefore be raised. The lever device shown in FIG. 4 has a toggle lever arrangement which is formed by the double strut 51 and the lever 50. In this connection, that part of the lever 50 which is situated between the axes 16 and 14 has the function of a toggle lever.

The four-bar mechanism formed by the axes of rotation 17, 16, 14 and 11 is furthermore designed in such a manner that self-locking or locking is possible by means of the lever device if the lever 50 is in the lower position and, accordingly, the extension arm 10 is in the position shown in FIG. 5. In this position of the lever device, the wheel 8 is in the raised position. Accordingly, the weight of the leg of the hospital bed 100 acts via the wheel 8 firstly on the ramp 5 and secondly on the rotary sleeve 7 of the extension arm 10. Since, however, a weight component also acts on the extension arm 10 and the lever 50 is arranged in its lower position—for example shown in FIG. 5, the axis 16 between lever 50 and double strut 51 is accordingly also arranged in a lower position. Owing to the arrangement of the axes 17, 11, 16 and 14 of the four-bar mechanism that is present in this position of the lever device, the extension arm 10 is fixed in its upper position, since the lever device is in a self-locking position. This self-locking is obtained by overextending the lever 50, which acts as a toggle lever, in conjunction with the double strut 51, namely by the axis 16 being arranged below the connecting line between the axes 17 and 14 in the self-locking position. Since the lever 50 in the lower position rests on the axis 17 or the screw 40 or on the housing part 49 in the region between the double strut 51, its end position in this respect is thereby also fixed. The weight of the raised wheel 8, which weight acts on the extension arm 10 and therefore on the four-bar mechanism with the axes 17, 16, 11 and 14, has the effect that the lever 50 and therefore the lever device remain in this position, even if the weight acting on the weighing device 1 should be significantly increased. Accordingly, the extension arm 10 can only be brought again into its lower position if the lever 50 is actively brought out of its lower position shown in FIG. 5 and, with an appropriate application of force, again into the position shown in FIG. 4.

In this respect, the lever device has a "mechanical potential pot", since first of all force has to be applied in order to deflect the lever 50 downward out of the upper position shown in FIG. 4 and therefore to roll the wheel 8 and the load associated therewith obliquely upward onto the ramp 5. As soon as an intermediate position of the lever 50 is exceeded, the latter is brought into its lower position shown in FIG. 5 likewise under the effect of the load connected to the wheel 8, and therefore the lever device is in a stable state. In order to bring the lever 50 into the upper position shown in FIG. 4, the lever 50 is to be raised somewhat under the application of force, with the wheel 8 first of all being raised a little further until the lever 50 can also be moved under the action of force of the wheel 8 into the upper position, and therefore the extension arm 10 and the rotary sleeve 7 can be brought into the lower position and the wheel 8 can be released from the weighing device 1.

Figure 7:
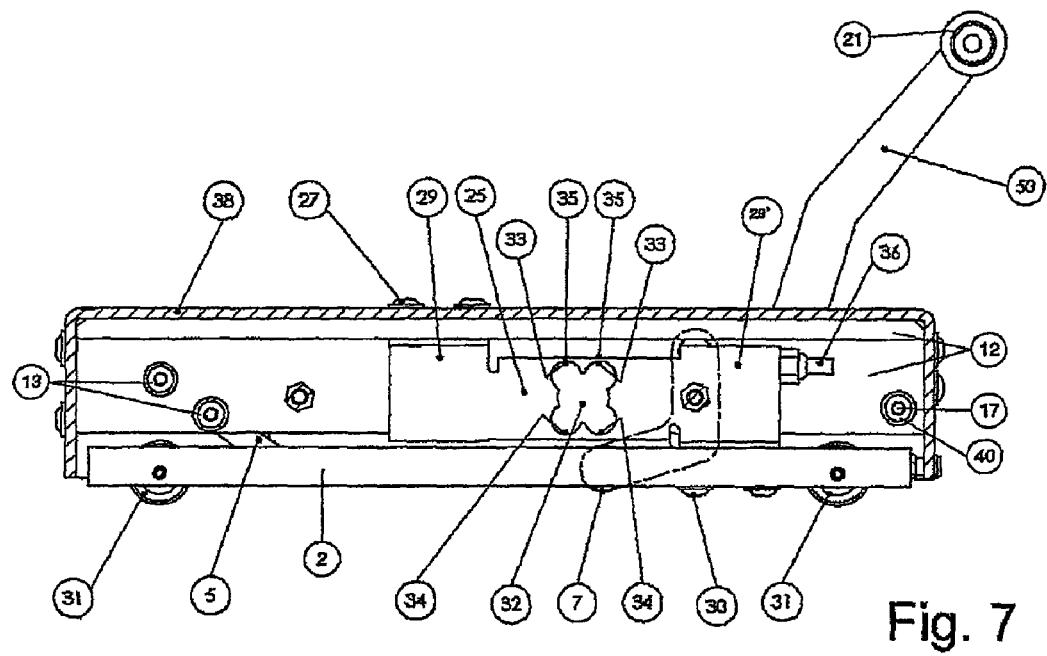
FIG. 7 shows a sectional view along the arrows VII-VII from FIG. 3.
Figure 8:
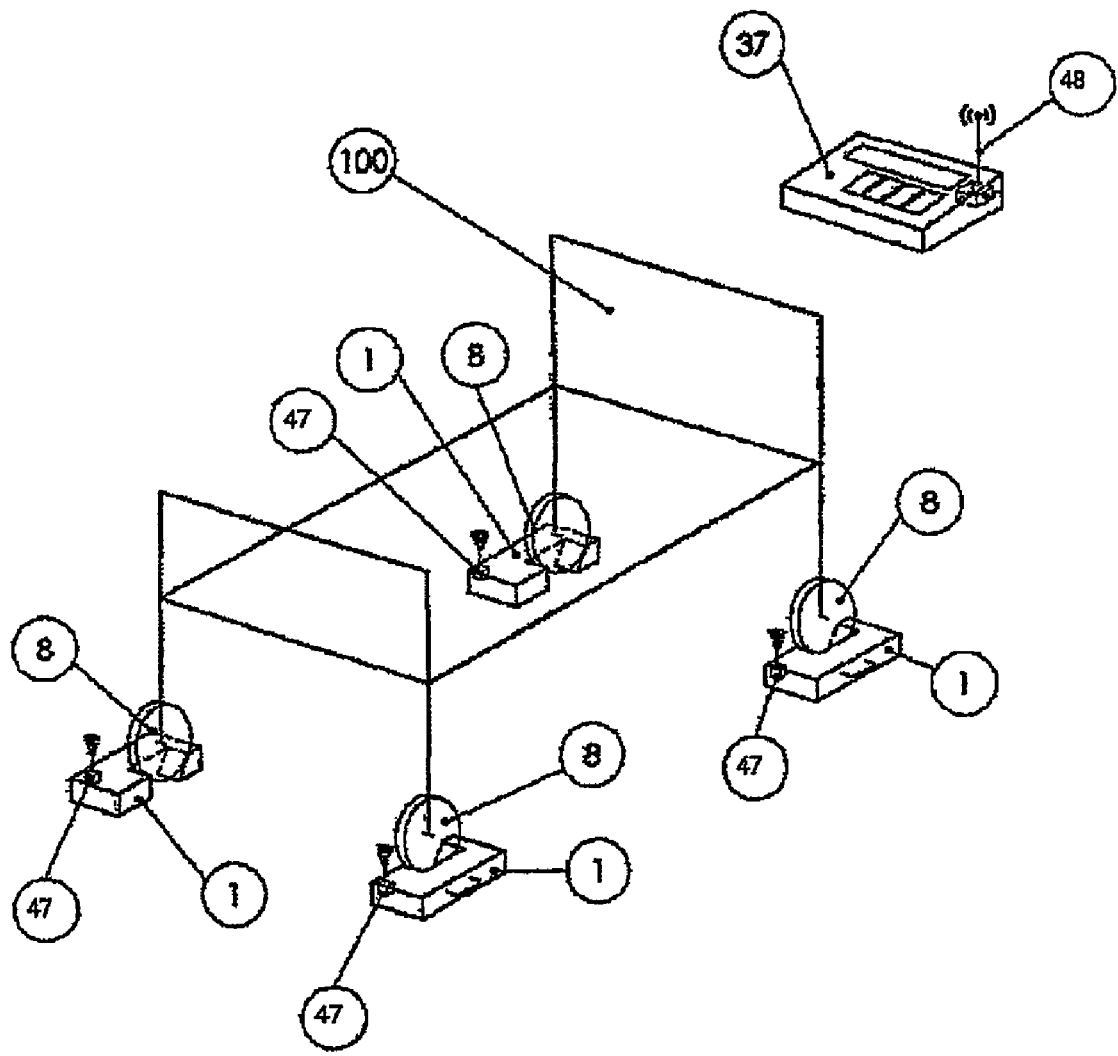
FIG. 8 shows a schematic illustration of a further exemplary embodiment of a bed weighing machine.

In a raised state of the wheel 8, the weight of the wheel 8, and therefore of the leg of the hospital bed 100, therefore rests on the ramp 5 and the rotary sleeve 7 of the extension arm 10 and therefore on the plate 12 and on the covering hood 38. The plate 12 and the covering hood 38 are connected to the base plate 2 via the measuring element 25. It can be seen in FIG. 7 that the plate 12 and the covering hood 38 are connected to the left part 29 of the measuring element 25 by means of the screws 27. The right part 29' of the measuring element 25 is connected to the base plate 2 by means of the screws 30. The measuring element 25 has a recess 32 which is essentially in the shape of a four-leaf clover. Accordingly, two predetermined bending points 33, 33 and 34, 34 are formed at the top and bottom in the recess 32. Strain gages 35 are fitted to the predetermined bending points 33, the electrical resistance of which gages changes upon extension as a consequence of bending of the predetermined bending point 33, and therefore an electric signal which is dependent on the load acting on the weighing device 1 can be derived therefrom. This electric signal can be transmitted in accordance with the lines 44 shown in FIG. 1 without cables in accordance with the transmitters/receivers 47, 48 shown in FIG. 8 to the evaluator 37 where the weight of the object to be weighed can be displayed and/or stored and/or printed out. The operation of the bed weighing machine is as follows: the weighing devices 1 are pushed by an operator with the aid of the handle 43 successively laterally under the wheels 8 of the hospital bed 100 such that the state shown in FIG. 1 or 8 is present. Then the lever 50 for each weighing device 1 is pressed downward, as a result of which the extension arm 10 and the rotary sleeve 7 each push the wheel 8 onto the ramp 5. A weighing device 1 can be fitted virtually in any desired position relative to a wheel 8 before the wheel 8 is raised, since, during the lifting operation of the wheel 8, firstly self-centering of the weighing device 1 relative to the wheel 8 takes place. This is possible on account of the rollers 31 which are provided on the base plate 2 and with which the entire weighing device 1 can be moved relative to the underlying surface 9. This secondly also effectively prevents the weighing devices 1 from being distorted in relation to one another as the wheels 8 are moved onto the ramps 5.

The covering hood 38 can be fastened laterally to the vertically extending part of the plate 12 by means of the screws 39. The line connection 36 serves to connect lines to an evaluator as shown, for example, in FIG. 1 by means of the lines 44 to an evaluator 37.

Finally, it should especially be pointed out that the exemplary embodiments explained above serve merely to describe the claimed teaching but do not restrict the latter to the exemplary embodiments.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMBERS

100 Hospital bed
1 Weighing device
44 Lines
8 Wheel
37' Connecting box
37 Evaluator
4 Recess
5 Ramp
6 Arrow
7 Rotary sleeve
38 Covering hood
13 Screw
12 Plate
3 Lifting device
50 Lever
51 Double strut
10 Extension arm
40 Screw
17 Axis
16 Axis
14 Axis
21 Handle part of (50)
11 Axis
41 Screw
49 Housing part
25 Measuring element
2 Base plate
27 Screws
28 Left part of (25)
29' Right part of (25)
30 Screws
32 Recess of (25)
33 Predetermined bending point
34 Predetermined bending point
35 Strain gage
47 Transmitter/receiver
48 Transmitter/receiver
43 Handle
31 Roller
39 Screw
36 Line connection

The invention claimed is:

1. A wheel suspender comprising:
a ramp;
a lifting device configured to apply a force onto a wheel so as to move the wheel up the ramp to a lifted position, wherein the wheel is a wheel of a bed;
an open space for the wheel defined by the ramp and the lifting device; and
a weighing device having a mechanism for weighing the bed via the wheel when the wheel is in the lifted position.

2. The wheel suspender as claimed in claim 1, wherein the lifting device comprises a lever device.

3. The wheel suspender as claimed in claim 2, wherein the lever device comprises a toggle lever or a toggle lever arrangement.

4. The wheel suspender as claimed in claim 2, wherein the lever device is configured to self-lock in at least one operating state.

5. The wheel suspender as claimed in claim 3, wherein the lever device can be fixed in a self-locking position by over-extension of the toggle lever or of the toggle lever arrangement.

6. The wheel suspender as claimed in claim 1, wherein the lifting device has a motor drive.

7. The wheel suspender as claimed in claim 1, wherein the lifting device has a crank drive.

8. The wheel suspender as claimed in claim 1, wherein the lifting device has a hydraulic or pneumatic drive.

9. The wheel suspender as claimed in claim 1, wherein the lifting device has a threaded drive.

10. The wheel suspender as claimed in claim 1, wherein the lifting device acts on the running surface of the wheel to be lifted.

11. The wheel suspender as claimed in claim 10, wherein the lifting device has a rotary sleeve or a thrust wheel which, during a lifting operation, rolls along the running surface of the wheel to be lifted.

12. The wheel suspender as claimed in claim 1, wherein the lifting device acts on the axle of the wheel to be lifted.

13. The wheel suspender as claimed in claim 1, wherein the wheel suspender has at least one sliding foot or at least one wheel for displacing the wheel suspender relative to the underlying surface.

14. The wheel suspender as claimed in claim 1, wherein the ramp has a section for receiving the wheel, or in that at least part of the ramp is arranged in a manner such that it can pivot about an axis.

15. The wheel suspender as claimed in claim 1, wherein the bed includes a plurality of wheels, and further comprising additional ramps, respective lifting devices and weighing devices each corresponding to a respective one of the wheels.

16. The wheel suspender as claimed in claim 15, wherein the weighing devices are linked to one another for weighing an object disposed on the bed.

17. The wheel suspender as claimed in claim 15, wherein the weighing devices are connected to a processor.

\* \* \* \* \*